United States Patent
Tsai et al.

(10) Patent No.: US 11,656,507 B2
(45) Date of Patent: May 23, 2023

(54) DISPLAY DEVICE

(71) Applicant: InnoLux Corporation, Miao-Li County (TW)

(72) Inventors: Tsung-Han Tsai, Miao-Li County (TW); Hsia-Ching Chu, Miao-Li County (TW); Mei-Chun Shih, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/944,660

(22) Filed: Sep. 14, 2022

(65) Prior Publication Data

US 2023/0008177 A1    Jan. 12, 2023

Related U.S. Application Data

(60) Continuation of application No. 16/999,350, filed on Aug. 21, 2020, now Pat. No. 11,474,400, which is a continuation of application No. 16/223,355, filed on Dec. 18, 2018, now Pat. No. 10,802,352, which is a division of application No. 15/587,428, filed on May 5, 2017, now Pat. No. 10,197,869.

(30) Foreign Application Priority Data

May 13, 2016 (TW) ................................. 105114848

(51) Int. Cl.
*G02F 1/1343* (2006.01)
*G02F 1/1333* (2006.01)
*G02F 1/1362* (2006.01)
*G02F 1/1368* (2006.01)
*G02F 1/1337* (2006.01)

(52) U.S. Cl.
CPC ...... *G02F 1/134309* (2013.01); *G02F 1/1368* (2013.01); *G02F 1/13439* (2013.01); *G02F 1/133345* (2013.01); *G02F 1/136286* (2013.01); *G02F 1/133707* (2013.01); *G02F 1/134363* (2013.01); *G02F 1/136227* (2013.01); *G02F 2202/10* (2013.01)

(58) Field of Classification Search
CPC ..................... G02F 1/134363; G02F 1/136227
See application file for complete search history.

(56) References Cited

U.S. PATENT DOCUMENTS

| | | | |
|---|---|---|---|
| 2011/0085099 A1* | 4/2011 | Kim | .................. G02F 1/133707 349/39 |
| 2016/0216570 A1* | 7/2016 | Yang | .................. G02F 1/134309 |
| 2020/0379304 A1 | 12/2020 | Tsai et al. | |

FOREIGN PATENT DOCUMENTS

CN          10 3489826 A       1/2014

* cited by examiner

*Primary Examiner* — Jessica M Merlin
(74) *Attorney, Agent, or Firm* — Bacon & Thomas, PLLC

(57) ABSTRACT

A thin film transistor substrate comprises: a substrate; a scan line disposed on the substrate and extending along a first direction; a semiconductor layer disposed on the scan line; and a drain electrode disposed on the semiconductor layer and comprising an arc edge outside the scan line, wherein a part of the semiconductor layer extends along a second direction perpendicular to the first direction and the arc edge overlaps the part of the semiconductor layer.

7 Claims, 9 Drawing Sheets

DISPLAY DEVICE

CROSS REFERENCE TO RELATED APPLICATION

This application claims the benefits of the Taiwan Patent Application Serial Number 105114848, filed on May 13, 2016, the subject matter of which is incorporated herein by reference.

This application is a continuation of U.S. Patent application for "Display device", U.S. application Ser. No. 16/999,350 filed Aug. 21, 2020, U.S. application Ser. No. 16/999,350 is a continuation of U.S. application Ser. No. 16/223,355 filed Dec. 18, 2018, U.S. application Ser. No. 16/223,355 is a division of U.S. Patent application for "Display device", U.S. application Ser. No. 15/587,428 filed May 5, 2017, and the subject matter of which is incorporated herein by reference.

BACKGROUND

1. Field

The present disclosure relates to a display device and, more particularly, to a display device with improved transmittance.

2. Description of Related Art

With the continuous development of technology related to displays, there is a trend in the display industry toward more compact, thinner and lighter products. Thus, thin displays, such as liquid crystal display devices, organic light-emitting diode display devices and inorganic light-emitting diode display devices have substituted for CRT displays as the dominant display devices in the market. Thin displays have an extensive application scope, and we can see them in many of consumer electronics, such as mobile phones, laptops, video cameras, still cameras, music players, mobile navigators, TV sets, etc.

Therein, liquid crystal display devices have been well developed and popular among consumers. However, in view of the consumers' increasing requirements to display quality of display devices, almost every dealer in this industry is investing in advancing display devices particularly in terms of display quality.

As liquid crystal display devices have entered an era of high resolution, transmittance of panels is now a key factor to the resulting display quality. Therefore, the relevant dealers all look to transmittance and contrast when improving display quality of display devices.

Therein, one factor related to the transmittance of the display devices is the overlapping area between common electrodes and pixel electrodes. In particular, slits of the pixel electrodes are the main region related to the tilts of the display medium (such as liquid crystal molecules). Hence, the overlapping region between the common electrodes and the pixel electrodes near to the slits of the pixel electrodes is one important factor related to the transmittance of the display device.

Therefore, it is desirable to provide a display device with improved transmittance to obtain better display quality and meet requirements of customers.

SUMMARY

An object of the present disclosure is to provide a thin film transistor substrate to improve the transmittance of the display device.

The thin film transistor substrate comprises: a substrate; a scan line disposed on the substrate and extending along a first direction; a semiconductor layer disposed on the scan line; and a drain electrode disposed on the semiconductor layer and comprising an arc edge outside the scan line, wherein a part of the semiconductor layer extends along a second direction perpendicular to the first direction and the arc edge overlaps the part of the semiconductor layer.

Other objects, advantages, and novel features of the present disclosure will become more apparent from the following detailed description when taken in conjunction with the accompanying drawings.

DETAILED DESCRIPTION OF EMBODIMENT

The following embodiments when read with the accompanying drawings are made to clearly exhibit the above-mentioned and other technical contents, features and effects of the present disclosure. Through the exposition by means of the specific embodiments, people would further understand the technical means and effects the present disclosure adopts to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Furthermore, the ordinals recited in the specification and the claims such as "first", "second", "third", "fourth" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

Additionally, the ordinals recited in the specification and the claims such as "above", "over", or "on" are intended not only directly contact with the other substrate, film or layer, but also intended indirectly contact with the other substrate, film or layer.

Embodiment 1

Figure 1:
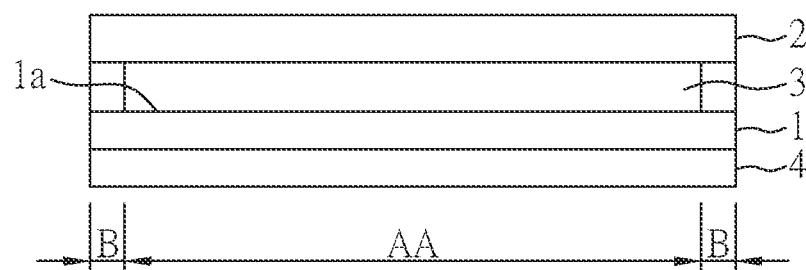
FIG. 1 is a cross-sectional view of a display device according to Embodiment 1 of the present disclosure.

FIG. 1 is a cross-sectional view of a display device according to Embodiment 1 of the present disclosure. The display panel of the present embodiment comprises: a substrate 1; a counter substrate 2 opposite to the substrate 1; and a display medium layer 3, disposed between the substrate 1 and the counter substrate 2. Herein, the display panel of the present embodiment comprises: a display region AA; and a border region B adjacent to the display region AA. In the present embodiment, the substrate 1 and the counter substrate 2 can respectively be, for example, a glass substrate, a plastic substrate, or any other flexible substrate. When the substrate 1 and the counter substrate 2 are plastic substrates or other flexible substrates, the display device of the present embodiment is a flexible display device. In addition, the display medium layer 3 can be a liquid crystal layer, light emitting layer of mirco-sized LED (light emitting diode) or light emitting layer of OLED (organic light emitting diode layer); and a backlight module 4 can further be disposed below the substrate 1 in the display device of the present embodiment, to provide light to the display panel.

In the present embodiment, various units can be disposed on the substrate 1 or the counter substrate 2. For example, thin film transistors (not shown in the figure) can be disposed on the substrate 1 to form a thin film transistor substrate. A color filter layer and a black matrix layer (not shown in the figure) can be disposed on the counter substrate 2 to obtain a color filter substrate. Alternatively, the color filter layer can be disposed on the substrate 1 to form a color filter on array (COA) substrate, or the black matrix layer can be disposed on the substrate 1 to form a black matrix layer on array (BOA) substrate. Hereinafter, the thin film transistor substrate in which thin film transistors are disposed on the substrate 1 is exemplified in the present embodiment.

Figure 2:
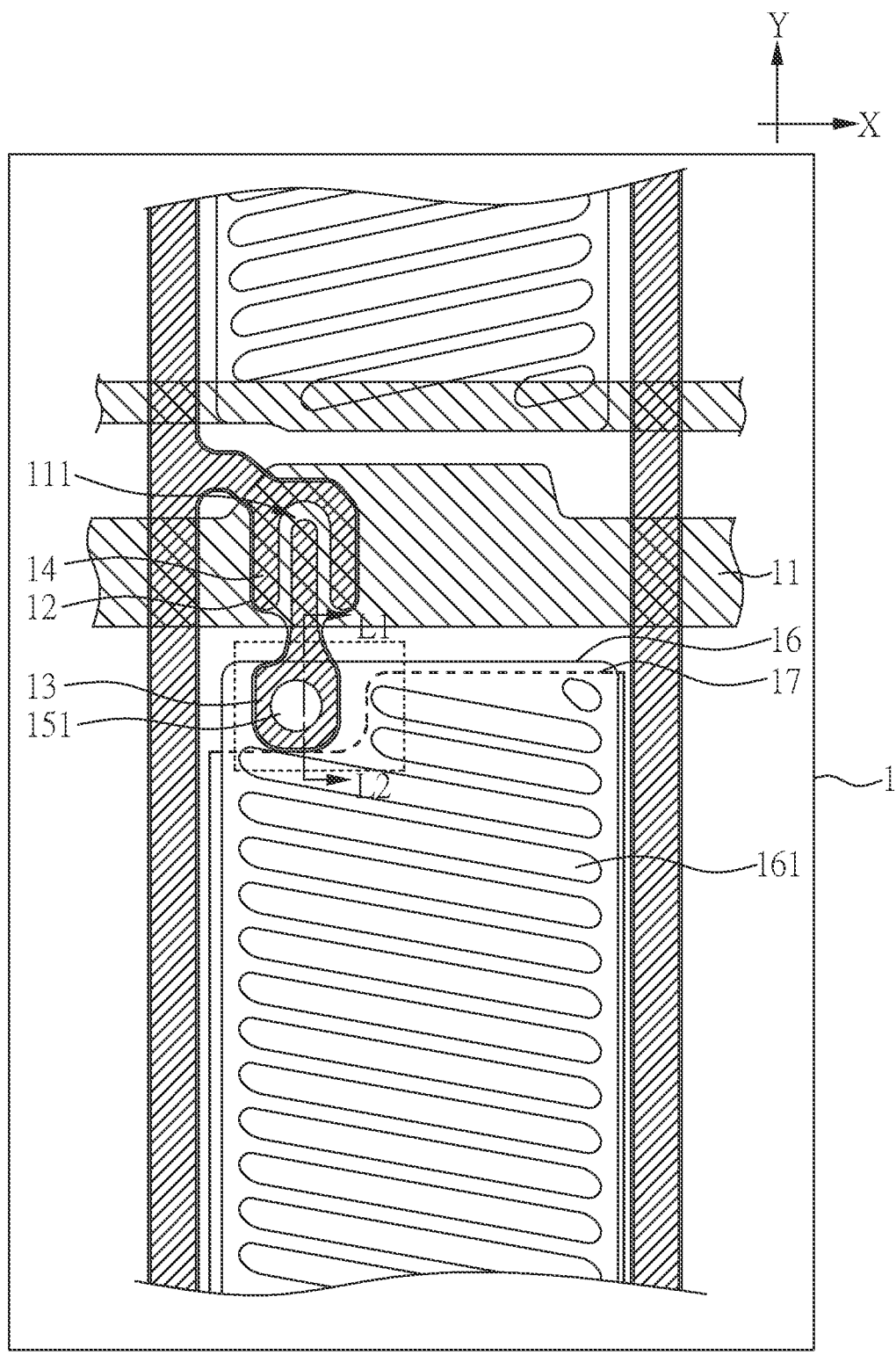
FIG. 2 is a top view of a thin film transistor substrate of a display device according to Embodiment 1 of the present disclosure.
Figure 3:
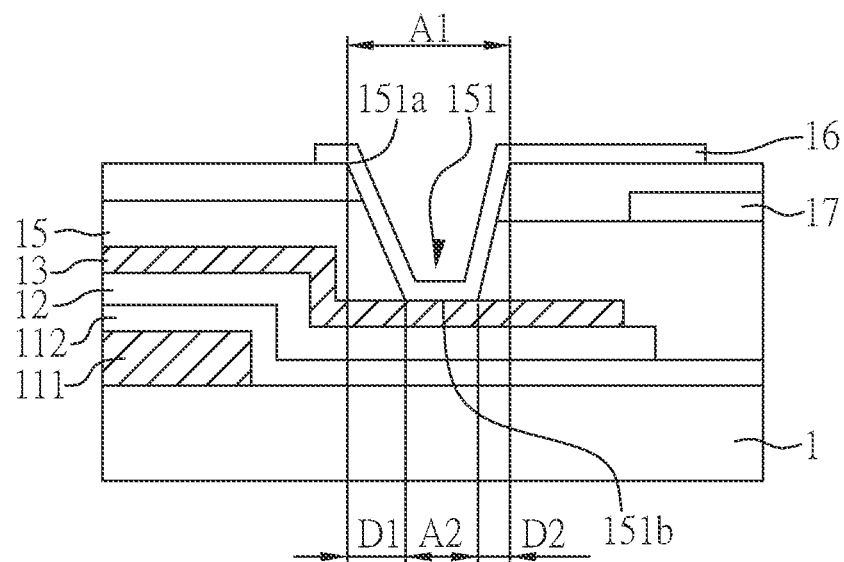
FIG. 3 is a cross-sectional view of a thin film transistor substrate along the line L1-L2 indicated in FIG. 2.

FIG. 2 is a top view of the thin film transistor substrate of the display device of the present embodiment; and FIG. 3 is a cross-sectional view of the thin film transistor substrate along the line L1-L2 indicated in FIG. 2. As shown in FIGS. 2 and 3, the thin film transistor substrate of the display device of the present embodiment comprises: a substrate 1; a scan line 11 disposed on the substrate 1, wherein the scan line 11 extends along an extension direction (i.e. a first direction X), and the scan line 11 comprises a gate electrode 111 (which is the region for forming a thin film transistor); a semiconductor layer 12 disposed on the gate electrode 111, wherein apart of the semiconductor layer 12 overlaps the gate electrode 111, and another part of the semiconductor layer 12 extends outside the gate electrode 111; a source electrode 14 and a drain electrode 13, disposed on the semiconductor layer 12 and disposed at two opposite sides of the semiconductor layer 12, wherein projections of the source electrode 14 and the drain electrode 13 on the substrate 1 completely locate in a projection of the semiconductor layer 12 on the substrate 1, and the gate electrode 111, the semiconductor layer 12, the source electrode 14 and the drain electrode 13 form a thin film transistor; an insulating layer 15 disposed on the source electrode 14 and the drain electrode 13, wherein the insulating layer 15 comprises a via hole 151; a first transparent conductive layer 16 disposed on the insulating layer 15, wherein a part of the first transparent conductive layer 16 electrically connects to the drain electrode 13 through the via hole 151; and a second transparent conductive layer 17 disposed between the substrate 1 and the first transparent conductive layer 16, wherein the second transparent conductive layer 17 and the via hole 151 are not overlapped. More specifically, the projection of the via hole 151 on the substrate 1 and the projection of the second transparent conductive layer 17 are not overlapped. In addition, as shown in FIG. 3, a gate insulating layer 112 is further formed on the gate electrode 111.

In the present embodiment and other embodiments of the present disclosure, the term "projection(s)" refers to the patterns that the units project onto the substrate 1 in a direction from the counter substrate 2 toward the substrate 1 (i.e. the direction perpendicular to the surface 1a of the substrate 1) shown in FIG. 1. In the top views shown in FIGS. 2, 4 and 9 of the present embodiment and other embodiments of the present disclosure, the patterns are the projections of the units projecting onto the substrate 1 in the direction from the counter substrate 2 toward the substrate 1 (i.e. the direction perpendicular to the surface 1a of the substrate 1).

In the present embodiment and other embodiments of the present disclosure, the scan line 11, the source electrode 14 and the drain electrode 13 can be prepared by conductive materials, such as metals, alloys, metal oxides, metal oxynitrides, or other electrode materials. The first transparent conductive layer 16 and the second transparent conductive layer 17 can be prepared by transparent electrode materials such as ITO, IZO or ITZO.

Figure 4:
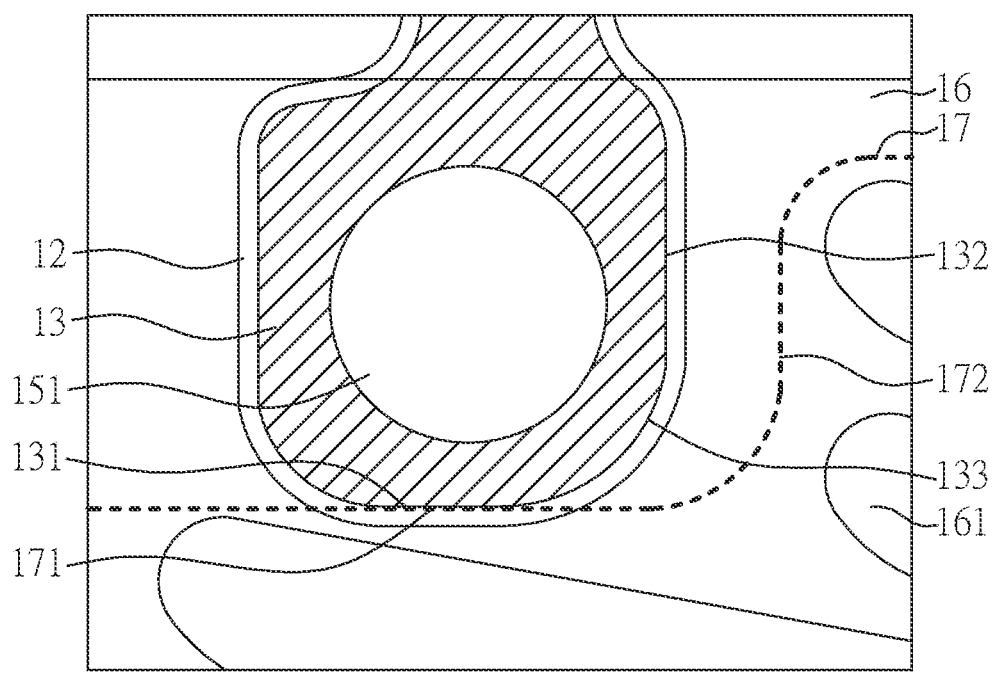
FIG. 4 is an enlarged view of the region indicated by dot lines in FIG. 2.

FIG. 4 is an enlarged view of the region indicated by dot lines in FIG. 2. As shown in FIG. 4, a projection of the second transparent conductive layer 17 on the substrate 1 has a first edge 171, a projection of the drain electrode 13 on the substrate 1 has a second edge 131, and the first edge 171 is adjacent to the second edge 131. More specifically, in the present embodiment, a minimum distance between the first edge 171 and the second edge 131 along a direction perpendicular to the extension direction (i.e. the first direction X) of the scan line 11 is 0 µm. In other word, the first edge 171 and the second edge 131 are partially overlapped.

As shown in FIGS. 2 and 4, in the display device of the present embodiment, the second transparent conductive layer 17 and the via hole 151 of the insulating layer 15 are not overlapped, and a first edge 171 of the second transparent conductive layer 17 is adjacent to the second edge 131 of the drain electrode 13. In general, the voltage difference between the first transparent conductive layer 16 and the second transparent conductive layer 17 influences the tilts of the display medium (for example, liquid crystal molecules), and the transmittance of the display device is related to the tilts of the display medium. The area that the display medium tilts based on the voltage change can be increased when the overlapping region of the first transparent conductive layer 16 and the second transparent conductive layer 17 is expanded; thus the transmittance of the display device can be improved. However, in the case that the overlapping region of the second transparent conductive layer 17 and the drain electrode 13 is too large and cover the via hole 151 of the insulating layer 15, short circuit may be occurred between the first transparent conductive layer 16 and the second transparent conductive layer 17. Hence, in the present embodiment, when the minimum distance between the first edge 171 and the second edge 131 along a direction perpendicular to the extension direction (i.e. the first direction X) of the scan line 11 ranges from 0 µm to 4 µm, not only the transmittance of the display device can be improved, but also the circumstance that the short circuit occurred between the first transparent conductive layer 16 and the second transparent conductive layer 17 can be prevented.

Additionally, in the present embodiment, as shown in FIGS. 1 and 4, when viewing in a normal direction of the substrate 1 (i.e. viewing from the counter substrate 2 to the substrate 1), a part of the second transparent conductive layer 17 overlaps the semiconductor layer 12, but the second transparent conductive layer 17 does not overlap the drain electrode 13.

As shown in FIGS. 2 and 4, in the present embodiment, the second transparent conductive layer 17 further comprises a third edge 172, the third edge 172 is substantially perpendicular to the extension direction (i.e. the first direction X) of the scan line 11. In other words, the extension direction of the third edge 17 substantially is the second direction Y. Herein, the third edge 172 and the drain electrode 13 are not overlapped.

In the present embodiment and other embodiments of the present disclosure, "the third edge 172 is substantially perpendicular to the extension direction (i.e. the first direction X) of the scan line 11" and/or "second direction Y" can be defined as follows: an angle can be included between the third edge 172/the second direction Y and the first direction X, and this angle can range from 70 degrees to 90 degrees, 80 degrees to 90 degrees or 85 degrees to 90 degrees.

As shown in FIG. 3, a side wall of the via hole 151 is an inclined side wall, so the via hole 151 has an inverted trapezoidal shape in a cross-section view. Hence, in the present embodiment, the via hole 151 has a first opening 151a and a second opening 151b, the first opening 151a is close to the first transparent conductive layer 16, and the second opening 151b is close to the drain electrode 13. In other words, the first opening 151a is relatively adjacent to the counter substrate 2 shown in FIG. 1, and the second opening 151b is relatively adjacent to the substrate 1 shown in FIG. 1. In FIG. 3, a width A1 of the first opening 151a is greater than a width A2 of the second opening 151b, so it intends an area of the first opening 151a is greater than an area of the second opening 151b when viewed in a top view (viewed from the counter substrate 2 to the substrate 1), it also intends when the first opening 151a and the second opening 151b respectively projected on the substrate 1 to form a first projection and a second projection, the area of the first projection is greater than the second projection.

In addition, a part of the insulating layer 15 is exposed from the via hole 151. Furthermore, through controlling the etching condition for forming the via hole 151, a first minimum distance D1 and a second minimum distance D2 are distances between the first projection of the first opening 151a and the second projection of the second opening 151b on the substrate 1 in a direction parallel to the extension direction (i.e. the first direction X) of the scan line 11, and the first minimum distance D1 is not equal to the second minimum distance D2.

In addition, as shown in FIG. 4, the first transparent conductive layer 16 comprises at least one slit 161, and the drain electrode 13 further comprises a fourth edge 132; wherein in a region that the drain electrode 13 overlaps the first transparent conductive layer 16, an arc edge 133 of the drain electrode 13 near to the slit 161 is between the second edge 131 and the fourth edge 132. In the present embodiment, the fourth edge 132 is substantially perpendicular to the extension direction (i.e. the first direction X) of the scan line 11. Herein, "the fourth edge 132 is substantially perpendicular to the extension direction (i.e. the first direction X) of the scan line 11" means that an angle included between the fourth edge 132 and the first direction X can range from 70 degrees to 90 degrees, 80 degrees to 90 degrees or 85 degrees to 90 degrees.

The transparency of the drain electrode 13 is poor, which may influence the transmittance of the display device. Hence, the smaller area of the drain electrode 13 is the better. In the present embodiment, when the drain electrode 13 has the arc edge 133, the area of the drain electrode 13 can be reduced. Especially, when the area of the drain electrode 13 close to the slit 161 of the first transparent conductive layer 16 is reduced, the transmittance of the display device can further be improved.

Embodiment 2

Figure 5:
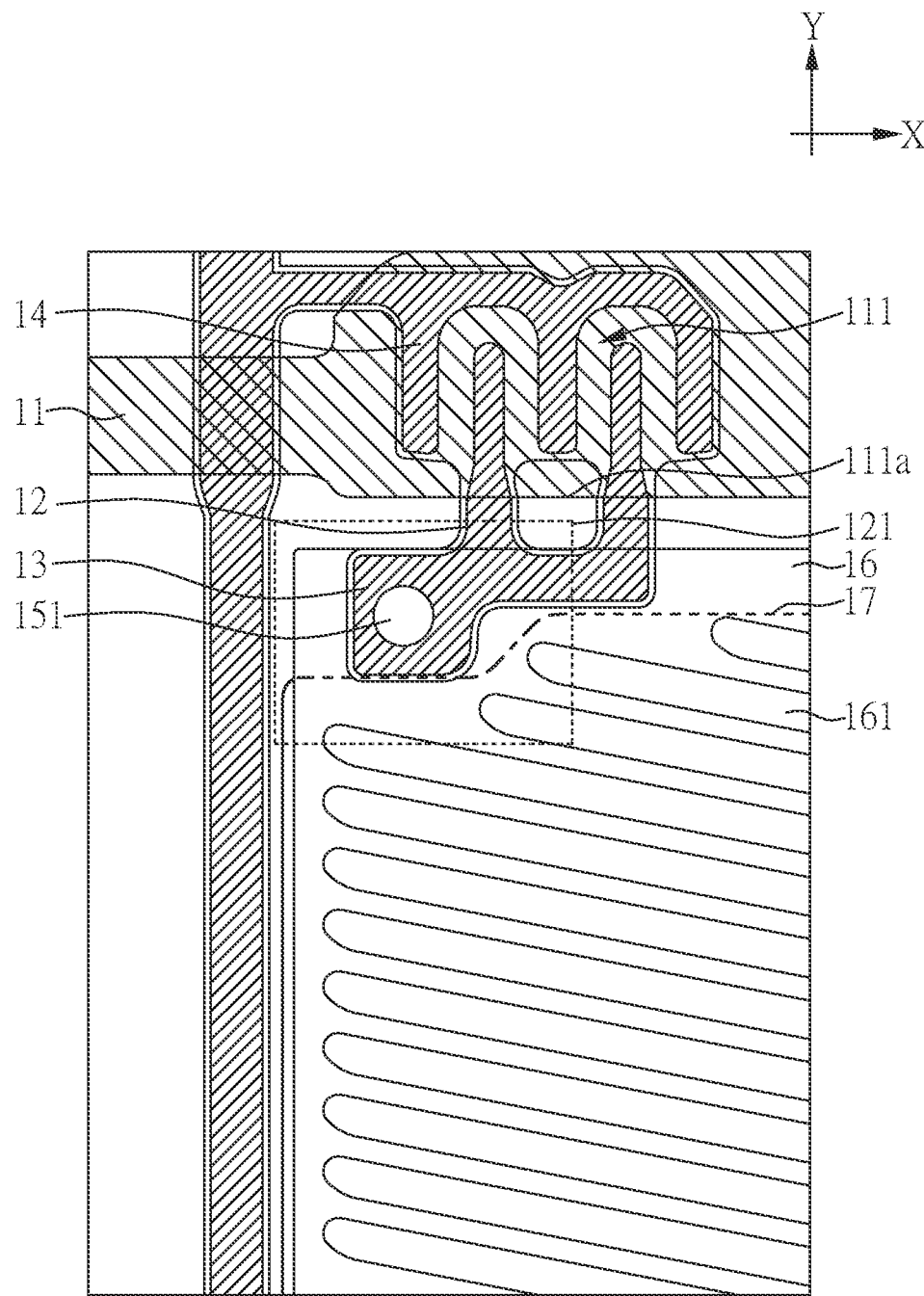
FIG. 5 is a top view of a thin film transistor substrate of a display device according to Embodiment 2 of the present disclosure.
Figure 6:
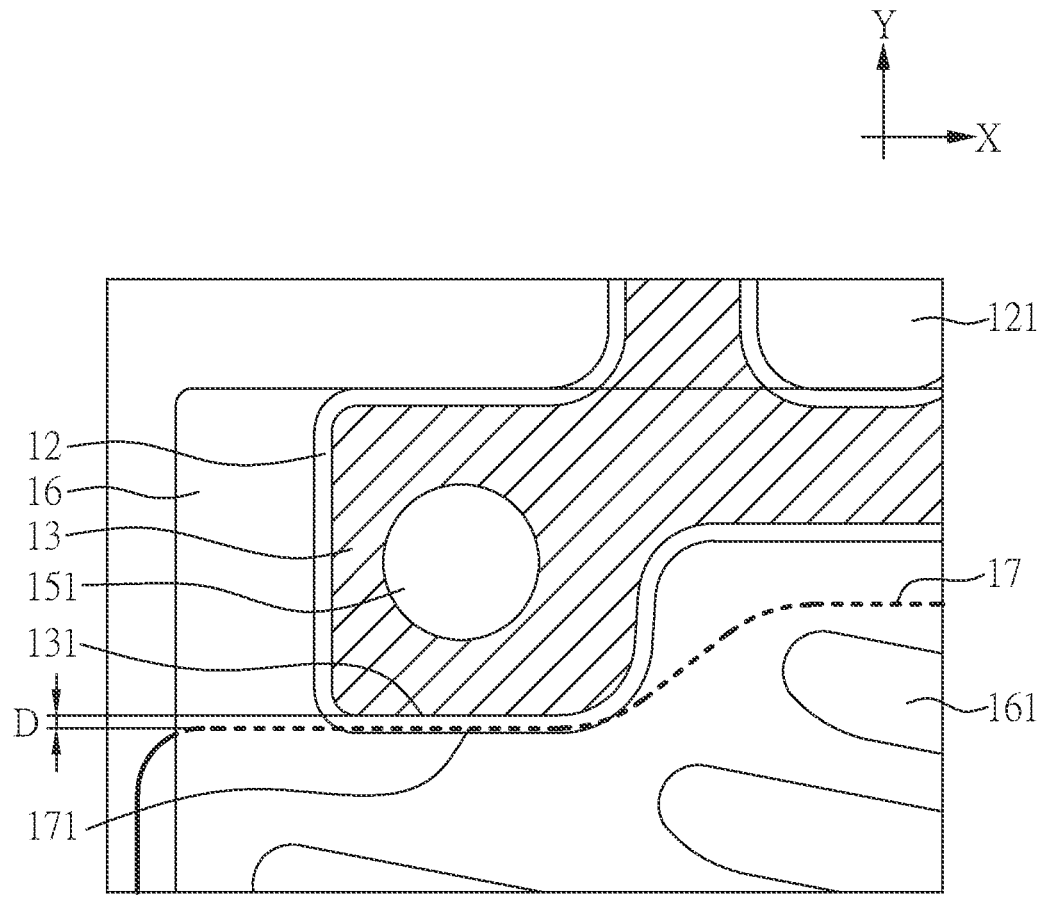
FIG. 6 is an enlarged view of the region indicated by dot lines in FIG. 5.

FIG. 5 is a top view of a thin film transistor substrate of a display device of the present embodiment, and FIG. 6 is an enlarged view of the region indicated by dot lines in FIG. 5. As shown in FIGS. 5 and 6, the thin film transistor substrate of the present embodiment is similar to that of Embodiment 1, except for the following differences.

The structures of the drain electrode 13 and the source electrode 14 are slightly different from those shown in Embodiment 1, but the operations thereof are identical.

As shown in FIG. 6, in the present embodiment, the second transparent conductive layer 17 and the via hole 151 are not overlapped. A projection of the second transparent conductive layer 17 on the substrate (not shown in the figure) has a first edge 171, a projection of the drain electrode 13 on the substrate (not shown in the figure) has a second edge 131 adjacent to the first edge 171, and a minimum distance D between the first edge 171 and the second edge 131 along a direction perpendicular to the extension direction (i.e. the first direction X) of the scan line 11 is greater than 0 μm and less than or equal to 4 μm, or greater than 0 μm and less than or equal to 2 μm.

In the present embodiment, the minimum distance D between the first edge 171 and the second edge 131 along a direction perpendicular to the extension direction (i.e. the first direction X) of the scan line 11 is greater than 0 μm and less than or equal to 4 μm (or greater than 0 μm and less than or equal to 2 μm); thus, the same purpose indicated in Embodiment 1 (that the transmittance of the display device can be improved and the circumstance that the short circuit occurred between the first transparent conductive layer and the second transparent conductive layer can be prevented) can also be achieved by the display device of the present embodiment.

As shown in FIG. 6, in the present embodiment, a part of the second transparent conductive layer 17 overlaps the semiconductor layer 12, but the second transparent conductive layer 17 does not overlap the drain electrode 13.

Furthermore, as shown in FIG. 5, the semiconductor layer 12 comprises a third opening 121, and the third opening 121 disposed on and exposes a part of an edge 111a of the gate electrode 111. When the semiconductor layer 12 comprises this third opening 121, in the region outside the gate electrode 111 of the scan line 11, the exposed area of the semiconductor layer 12 that is not covered by the source electrode 14 and the drain electrode 13 can be reduced. Therefore, the photo leakage current can be decreased, and the performance of the thin film transistor can be maintained.

Embodiment 3

Figure 7:
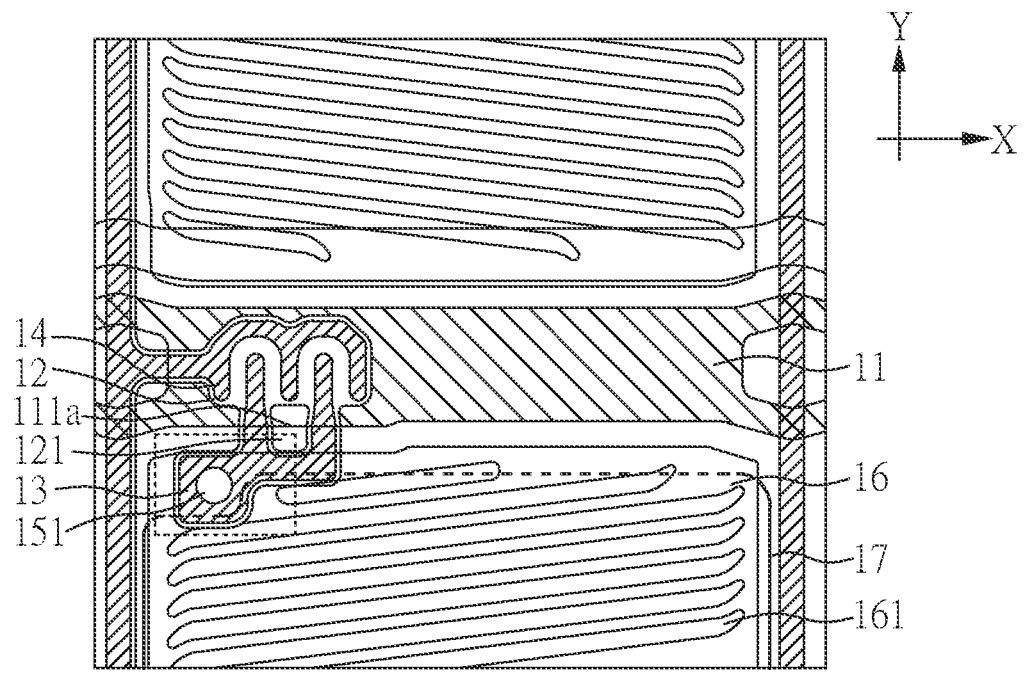
FIG. 7 is a top view of a thin film transistor substrate of a display device according to Embodiment 3 of the present disclosure.
Figure 8:
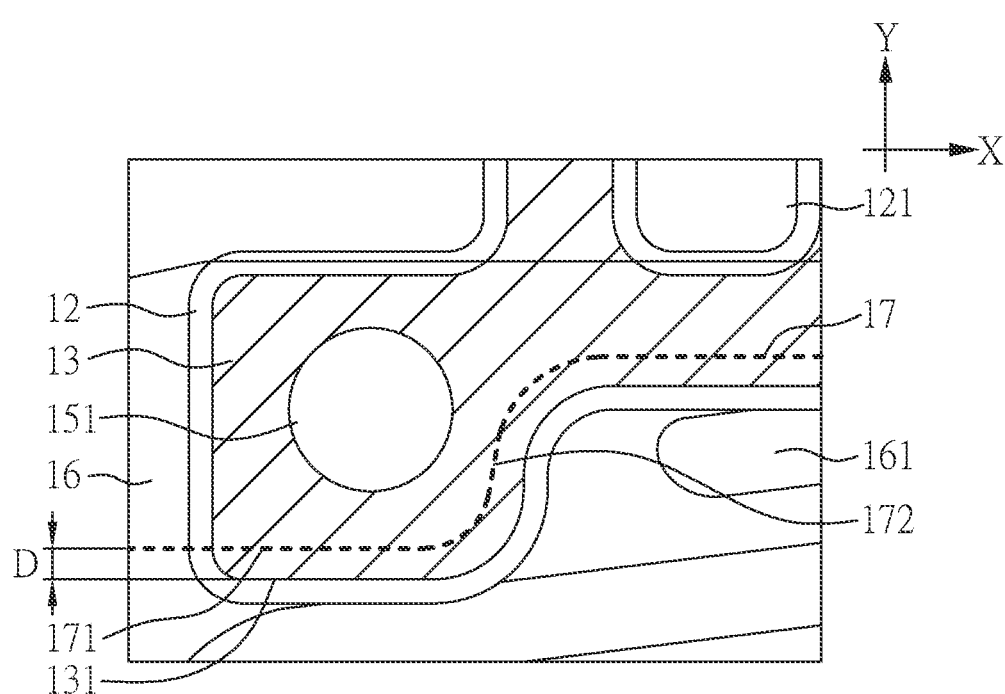
FIG. 8 is an enlarged view of the region indicated by dot lines in FIG. 7.

FIG. 7 is a top view of a thin film transistor substrate of a display device of the present embodiment, and FIG. 8 is an enlarged view of the region indicated by dot lines in FIG. 7. As shown in FIGS. 7 and 8, the thin film transistor substrate of the present embodiment is similar to that of Embodiment 1, except for the following differences.

The structures of the drain electrode 13 and the source electrode 14 are slightly different from those shown in Embodiment 1, but the operations thereof are identical.

As shown in FIG. 8, in the present embodiment, the second transparent conductive layer 17 and the via hole 151 are not overlapped. A projection of the second transparent conductive layer 17 on the substrate (not shown in the figure) has a first edge 171, a projection of the drain electrode 13 on the substrate (not shown in the figure) has a second edge 131, and a minimum distance D between the first edge 171 and the second edge 131 along a direction perpendicular to the extension direction (i.e. the first direction X) of the scan line 11 is greater than 0 µm and less than or equal to 4 µm, or greater than 0 µm and less than or equal to 2 µm.

As shown in FIG. 8, in the present embodiment, when viewing in a normal direction of the substrate 1 (i.e. viewing from the counter substrate 2 to the substrate 1), a part of the second transparent conductive layer 17 overlaps the semiconductor layer 12 and the drain electrode 13. Especially, the first edge 171 of the second transparent conductive layer 17 overlaps with the drain electrode 13. Furthermore, the second transparent conductive layer 17 further comprises a third edge 172, the third edge 172 is substantially perpendicular to the extension direction (i.e. the first direction X) of the scan line 11. In other words, the extension direction of the third edge 172 substantially is the second direction Y. Herein, the third edge 172 overlaps the drain electrode 13.

Furthermore, as shown in FIG. 7, the semiconductor layer 12 comprises a third opening 121, and the third opening 121 exposes a part of an edge 111a of the gate electrode 111.

Embodiment 4

Figure 9:
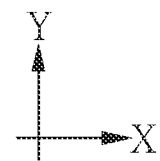
FIG. 9 is a top view of a thin film transistor substrate of a display device according to Embodiment 4 of the present disclosure.
Figure 9:
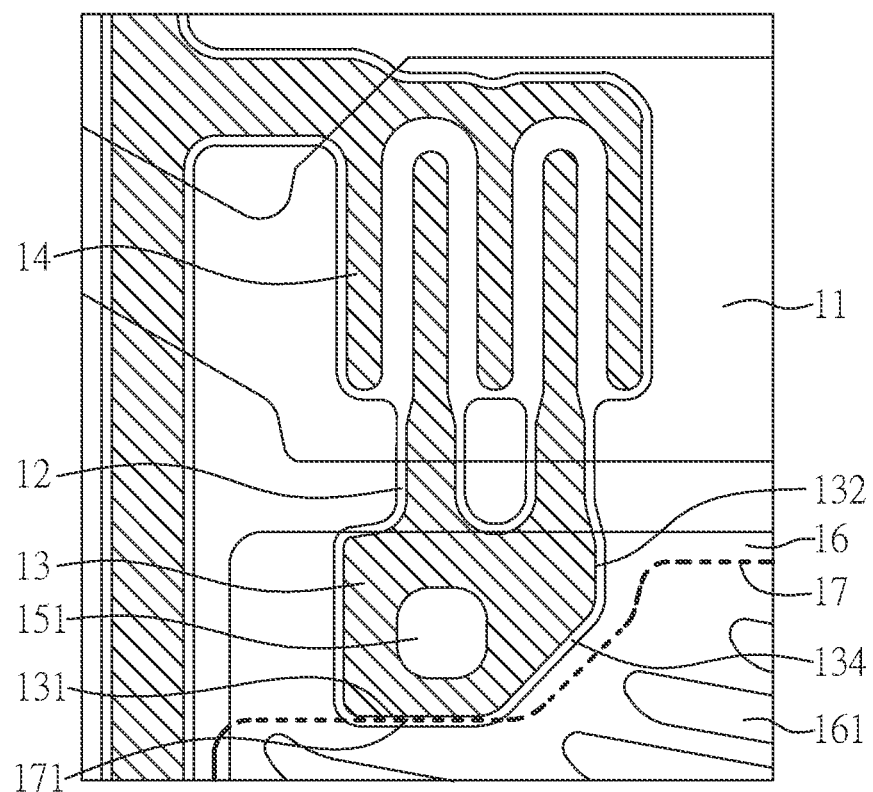

FIG. 9 is a top view of a thin film transistor substrate of a display device of the present embodiment. As shown in FIG. 9, the thin film transistor substrate of the present embodiment is similar to those of Embodiments 1 and 2, except for the following difference.

In the present embodiment, the first transparent conductive layer 16 comprises at least one slit 161, and the drain electrode 13 further comprises a fourth edge 132. Herein, the fourth edge 132 is substantially perpendicular to the extension direction (i.e. the first direction X) of the scan line 11. In the region that the drain electrode 13 overlaps the first transparent conductive layer 16, an inclined edge 134 of the drain electrode 13 close to the slit 161 is between the second edge 131 and the fourth edge 132, and obtuse angles are included between the inclined edge 134 and the second edge 131 and between the inclined edge 134 and the fourth edge 132.

The drain electrode 13 of the present embodiment has the inclined edge 134, and the drain electrode 13 of Embodiment 1 has the arc edge 133. In both the display devices with the inclined edge 134 of the present embodiment and the arc edge 133 of Embodiment 1, the purpose of increasing the transmittance of the display device can be achieved.

Test Example

As illustrated in the aforesaid Embodiments 1 to 4 (as shown in FIGS. 4, 6, 8 and 9), when the minimum distance D between the first edge 171 and the second edge 131 along a direction perpendicular to the extension direction (i.e. the first direction X) of the scan line 11 ranges from 0 µm to 4 µm (or ranges from 0 µm to 2 µm), the purpose of improving transmittance and preventing short circuit can be achieved. In the present test example, the influence of the distance between the first edge 171 of the second transparent conductive layer 17 and the second edge 131 of the drain electrode 13 on the transmittance of the thin film transistor substrate is simulated. Meanwhile, the distance between the third edge 172 of the second transparent conductive layer 17 and the fourth edge 132 of the drain electrode 13 on the transmittance of the thin film transistor substrate is also simulated.

Figure 10A:
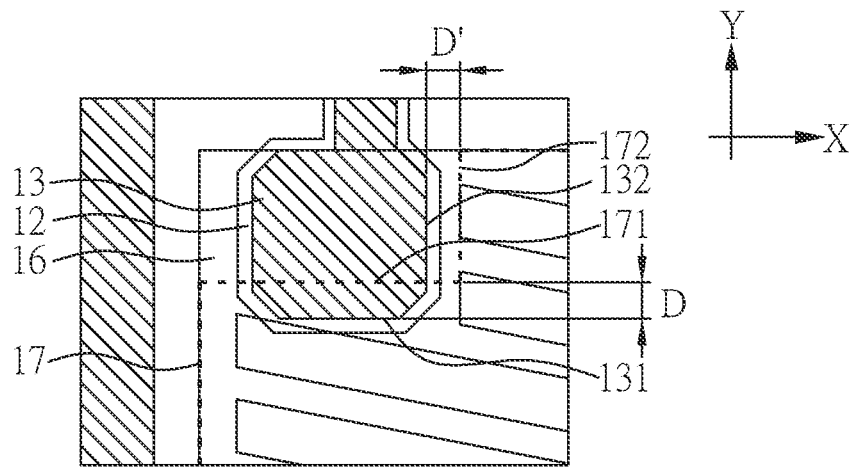
FIGS. 10A to 10C are perspective views of thin film transistor substrates used in Test example of the present disclosure.
Figure 10B:
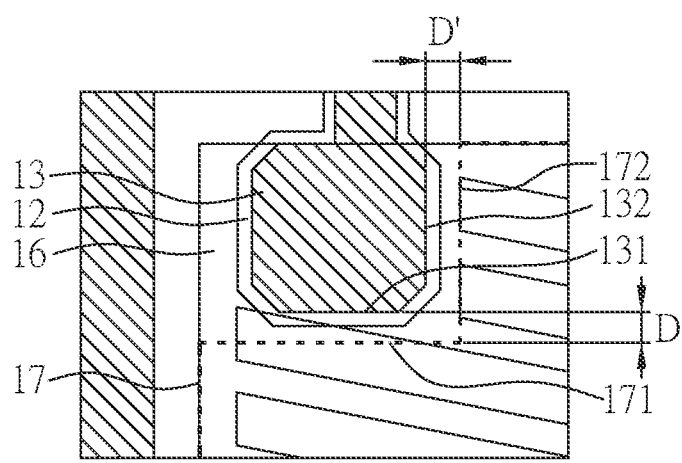
Figure 10C:
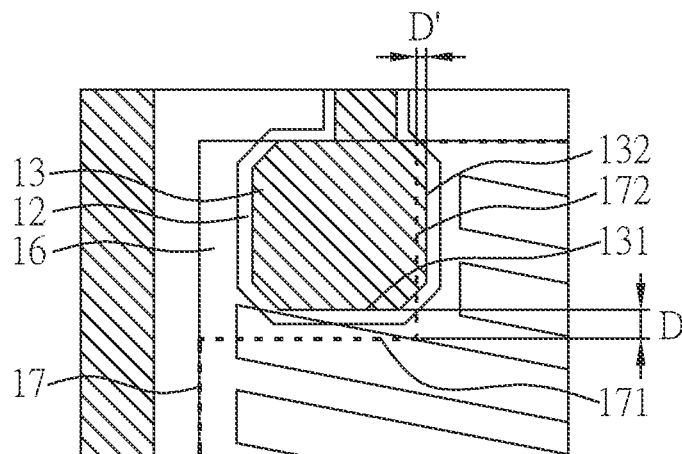
Figure 11:
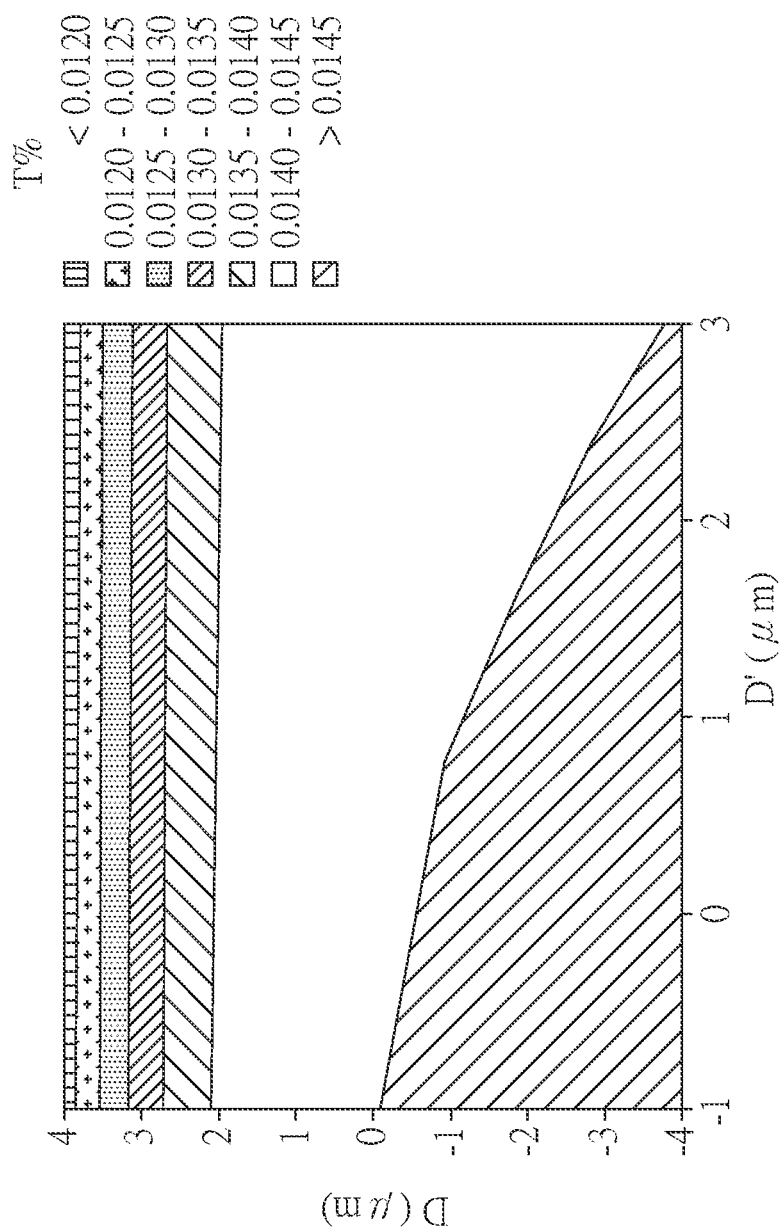
FIG. 11 shows a test result of Test example of the present disclosure.

FIGS. 10A to 10C are perspective views of thin film transistor substrates used in the present test example. FIG. 10A shows the condition that a part of the second transparent conductive layer 17 and the drain electrode 13 are overlapped, and the first edge 171 of the second transparent conductive layer 17 is locating on the drain electrode 13. FIG. 10B shows the condition that the second transparent conductive layer 17 and the drain electrode 13 are not overlapped. FIG. 10C shows the condition that a part of the second transparent conductive layer 17 and the drain electrode 13 are overlapped, and the third edge 172 of the second transparent conductive layer 17 is locating on the drain electrode 13. Herein, a minimum distance D is between the first edge 171 of the second transparent conductive layer 17 and the second edge 131 of the drain electrode 13, and another distance D' is between the third edge 172 of the second transparent conductive layer 17 and the fourth edge 132 of the drain electrode 13. In the present test example, when the first edge 171 and the second edge 131 are overlapped, the minimum distance D is 0 µm. When the first edge 171 moves downward and is not on the drain electrode 13, the minimum distance D is positive (as shown in FIG. 10B or 10C). When the first edge 171 moves upward and is locating on the drain electrode 13, the minimum distance D is negative (as shown in FIG. 10A). In addition, when the third edge 172 and the fourth edge 132 are overlapped, the distance D' is 0 µm. When the third edge 172 moves toward the right side and is not on the drain electrode 13, the distance D' is positive (as shown in FIG. 10A or 10B). When the third edge 172 moves toward the left side and is locating on the drain electrode 13, the distance D' is negative (as shown in FIG. 10C).

The simulation result is shown in FIG. 14. For the relative position between the first edge 171 of the second transparent conductive layer 17 and the second edge 131 of the drain electrode 13, when the second transparent conductive layer 17 overlaps the drain electrode 13, the influence of the minimum distance D between the first edge 171 and the second edge 131 on the transmittance is low. However, when the second transparent conductive layer 17 and the drain electrode 13 are not overlapped, the transmittance is reduced as the minimum distance D between the first edge 171 and the second edge 131 increased. For the relative position between the third edge 172 of the second transparent conductive layer 17 and the fourth edge 132 of the drain electrode 13, when the second transparent conductive layer 17 overlaps the drain electrode 13, the influence of the distance D' between the third edge 172 and the fourth edge 132 on the transmittance is low. Meanwhile, when the second transparent conductive layer 17 and the drain electrode 13 are not overlapped, the transmittance is reduced as the distance D' between the third edge 172 and the fourth edge 132 increased. Even though the transmittance is reduced as the distance D' increased, the range of the reduced transmittance is small.

From the result shown in the present test example, when the first edge 171 of the second transparent conductive layer 17 is locating on the drain electrode 13, the display device has better transmittance.

In the present disclosure, a display device made as described in any of the embodiments of the present disclosure as described previously may be integrated with a touch panel to form a touch display device. In addition, a display device or touch display device made as described in any of the embodiments of the present disclosure as described previously may be applied to any electronic devices known in the art that need a display screen, such as displays, mobile phones, laptops, video cameras, still cameras, music players, mobile navigators, TV sets, and other electronic devices that display images.

Although the present disclosure has been explained in relation to its embodiment, it is to be understood that many other possible modifications and variations can be made without departing from the spirit and scope of the present disclosure as hereinafter claimed.

What is claimed is:

1. A thin film transistor substrate, comprising:
    a substrate;
    a scan line disposed on the substrate and extending along a first direction;
    a semiconductor layer disposed on the scan line; and
    a drain electrode disposed on the semiconductor layer and comprising an arc edge outside the scan line, wherein a part of the semiconductor layer extends along a second direction perpendicular to the first direction and the arc edge overlaps the part of the semiconductor layer.

2. The thin film transistor substrate of claim 1, wherein the drain electrode and the scan line are overlapped.

3. The thin film transistor substrate of claim 1, further comprising a transparent conductive layer disposed on the substrate, wherein the arc edge is not overlapped with the transparent conductive layer, and the transparent conductive layer is at least partially overlapped with the semiconductor layer.

4. The thin film transistor substrate of claim 3, wherein the transparent conductive layer comprises plural slits.

5. The thin film transistor substrate of claim 1, wherein a projection of the drain electrode on the substrate is located in a projection of the semiconductor layer on the substrate.

6. The thin film transistor substrate of claim 1, further comprising a source electrode disposed on the substrate, wherein a projection of the source electrode on the substrate is located in a projection of the semiconductor layer on the substrate.

7. The thin film transistor substrate of claim 1, further comprising:
    a counter substrate opposite to the substrate;
    a transparent conductive layer disposed on the substrate; and
    a display medium layer disposed between the transparent conductive layer and the counter substrate.

* * * * *